(12) United States Patent
Nuber et al.

(10) Patent No.: US 10,357,858 B2
(45) Date of Patent: Jul. 23, 2019

(54) ACTUATING DEVICE FOR A STEADY REST

(71) Applicant: Walter Maschinenbau GmbH, Tünbingen (DE)

(72) Inventors: Wolfgang Nuber, Rottenburg (DE); Stefan Wolfgram, Dettingen (DE)

(73) Assignee: Walter Maschinenbau GmbH, Tünbingen (DE)

( * ) Notice: Subject to any disclaimer, the term of this patent is extended or adjusted under 35 U.S.C. 154(b) by 0 days.

(21) Appl. No.: 15/758,956

(22) PCT Filed: Aug. 24, 2016

(86) PCT No.: PCT/EP2016/069948
§ 371 (c)(1),
(2) Date: Mar. 9, 2018

(87) PCT Pub. No.: WO2017/042031
PCT Pub. Date: Mar. 16, 2017

(65) Prior Publication Data
US 2018/0243868 A1    Aug. 30, 2018

(30) Foreign Application Priority Data

Sep. 10, 2015   (DE) .................. 10 2015 115 205

(51) Int. Cl.
*B23Q 1/76* (2006.01)
*B23Q 3/08* (2006.01)
(Continued)

(52) U.S. Cl.
CPC ................ *B23Q 1/76* (2013.01); *B23B 29/16* (2013.01); *B24B 41/065* (2013.01); *B25B 5/06* (2013.01)

(58) Field of Classification Search
CPC ........... B23Q 1/76; B23Q 3/186; B23L 29/16; B24L 41/065; B25B 5/06
See application file for complete search history.

(56) References Cited

U.S. PATENT DOCUMENTS 3,736,114 A * 5/1973 Okada .................. B24B 41/065
                                                        451/407
4,034,632 A    7/1977 Lohner
(Continued)

FOREIGN PATENT DOCUMENTS

DE     25 33 502 A1    1/1977
DE     42 07 114 A1    9/1993
(Continued)

OTHER PUBLICATIONS

German Patent and Trademark Office, Office Action—German Application No. 10 2015 115 205.3, dated Aug. 1, 2016, 10 pages (In German).

(Continued)

*Primary Examiner* — Sara Addisu
(74) *Attorney, Agent, or Firm* — Sunstein Kann Murphy & Timbers LLP

(57) ABSTRACT

An actuating device (10) actuates jaws (12) of a steady rest (11). The jaws can be used for clamping or supporting a workpiece (13). The actuating device includes a carrier (18) with a mounting side (20) to which the steady rest (11) can be mounted. An outer end (27*b*) of an actuating part (27) projects away from the mounting side (20) of the carrier (18) and includes a connecting arrangement (29) as the interface for the connection with an input part (14) of the steady rest (11). An inner end (27 *c*) of the actuating part (27) is movably coupled with a piston (35) of a pneumatic cylinder (36) via a coupling arrangement (34). The coupling arrangement 34 includes a slide (40) that is immovably connected to the piston (35), said slide having on it at least one slotted gate (44). The slotted gate (44) defines a gate path oriented obliquely to longitudinal direction L and to height direction H, along which gate path the at least one gate element (46)

(Continued)

Figure 1:
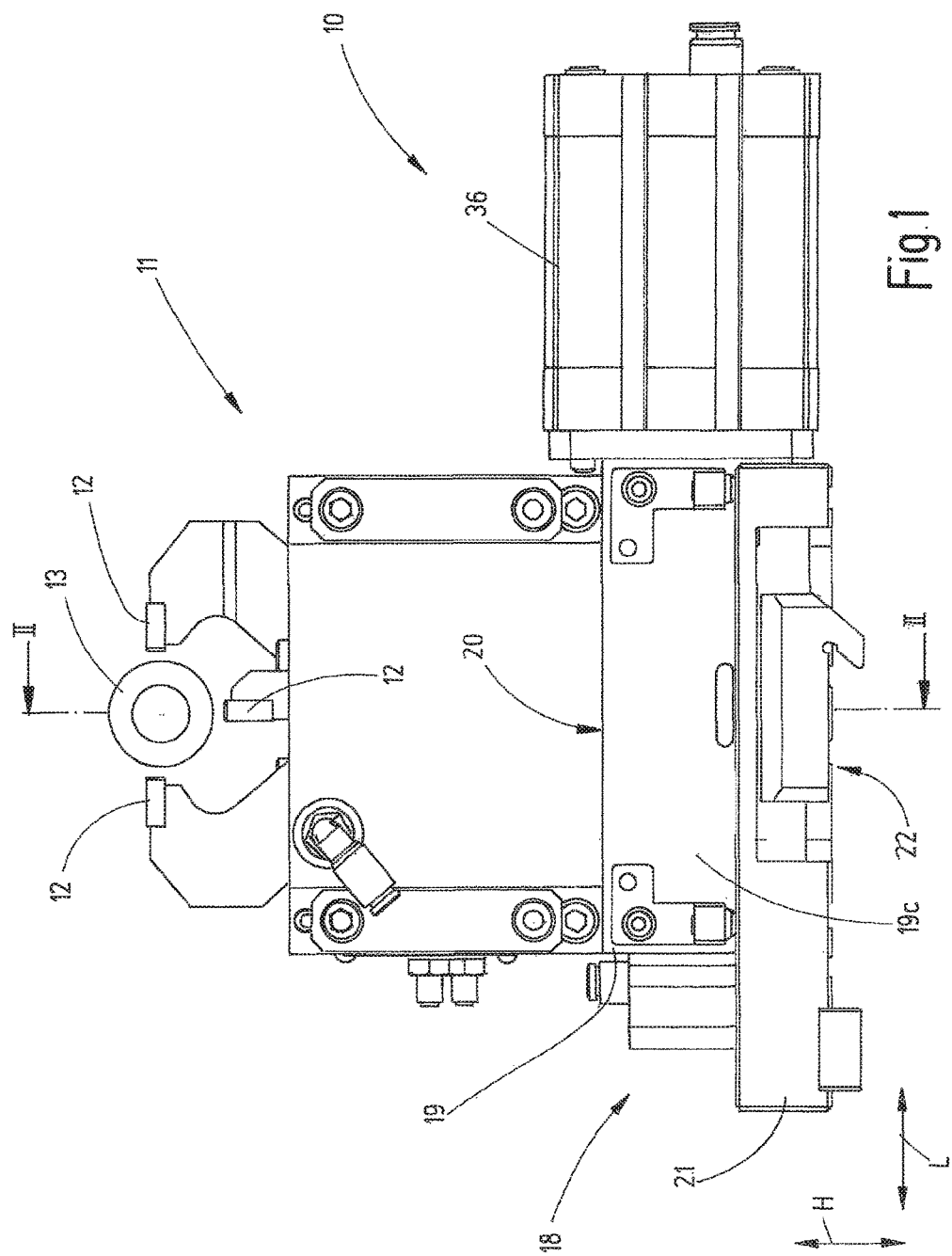

can be guided in a movable manner. The gate element is connected to the inner end (27c) of the actuating part (27).

15 Claims, 6 Drawing Sheets

(51) Int. Cl.
  *B23B 29/16* (2006.01)
  *B25B 5/06* (2006.01)
  *B24B 41/06* (2012.01)

(56) References Cited

U.S. PATENT DOCUMENTS

| | | | | |
|---|---|---|---|---|
| 4,335,764 | A * | 6/1982 | Schmidt | B27L 5/027 144/209.1 |
| 4,399,639 | A * | 8/1983 | Lessway | B24B 41/065 451/408 |
| 4,546,681 | A * | 10/1985 | Owsen | B23Q 1/76 294/116 |
| 4,559,987 | A * | 12/1985 | Fondronnier | B27L 5/027 144/213 |
| 5,201,501 | A * | 4/1993 | Fassler | B23Q 1/76 269/156 |
| 5,481,951 | A * | 1/1996 | Kiefer | B23Q 1/76 82/162 |
| 6,257,972 | B1 | 7/2001 | Lessway | |
| 6,699,113 | B2 * | 3/2004 | Lessway | B23Q 1/76 451/406 |
| 6,880,436 | B2 * | 4/2005 | Schlitters | B23B 29/16 82/110 |
| 6,896,603 | B1 | 5/2005 | Lessway | |
| 8,286,955 | B2 | 10/2012 | Damang | |
| 9,114,490 | B1 * | 8/2015 | Lessway | B23B 31/12 |
| 2004/0194593 | A1 * | 10/2004 | Siegwart | B23Q 1/76 82/162 |
| 2008/0139092 | A1 | 6/2008 | Lessway | |
| 2011/0209591 | A1 * | 9/2011 | Helm | B23Q 1/76 82/162 |
| 2012/0255407 | A1 * | 10/2012 | Maurer | B23Q 1/76 82/164 |
| 2012/0260779 | A1 * | 10/2012 | Maurer | B23Q 1/76 82/164 |
| 2013/0014620 | A1 * | 1/2013 | Hangleiter | B23Q 1/76 82/164 |
| 2015/0202695 | A1 * | 7/2015 | Bruder | B23B 41/12 408/1 R |
| 2015/0321303 | A1 * | 11/2015 | Esser | B23B 31/1269 82/164 |
| 2017/0326700 | A1 * | 11/2017 | Morimura | B23K 26/0093 |
| 2018/0243868 | A1 * | 8/2018 | Nuber | B23Q 1/76 |

FOREIGN PATENT DOCUMENTS

| | | |
|---|---|---|
| DE | 102 42 058 B4 | 1/2006 |
| DE | 602 08 835 T2 | 6/2006 |
| DE | 10 2011 054 063 B4 | 5/2013 |
| EP | 1 398 114 A2 | 3/2004 |
| EP | 2 058 084 A1 | 5/2009 |
| EP | 2 848 359 A1 | 3/2015 |
| JP | 06198529 A * | 7/1994 ............... B23Q 1/76 |

OTHER PUBLICATIONS

International Searching Authority, International Searching Authority International Search Report—International Application No. PCT/EP2016/069948, together with the Written Opinion of the International Searching Authority, dated Nov. 4, 2016, 10 pages (In German).

* cited by examiner

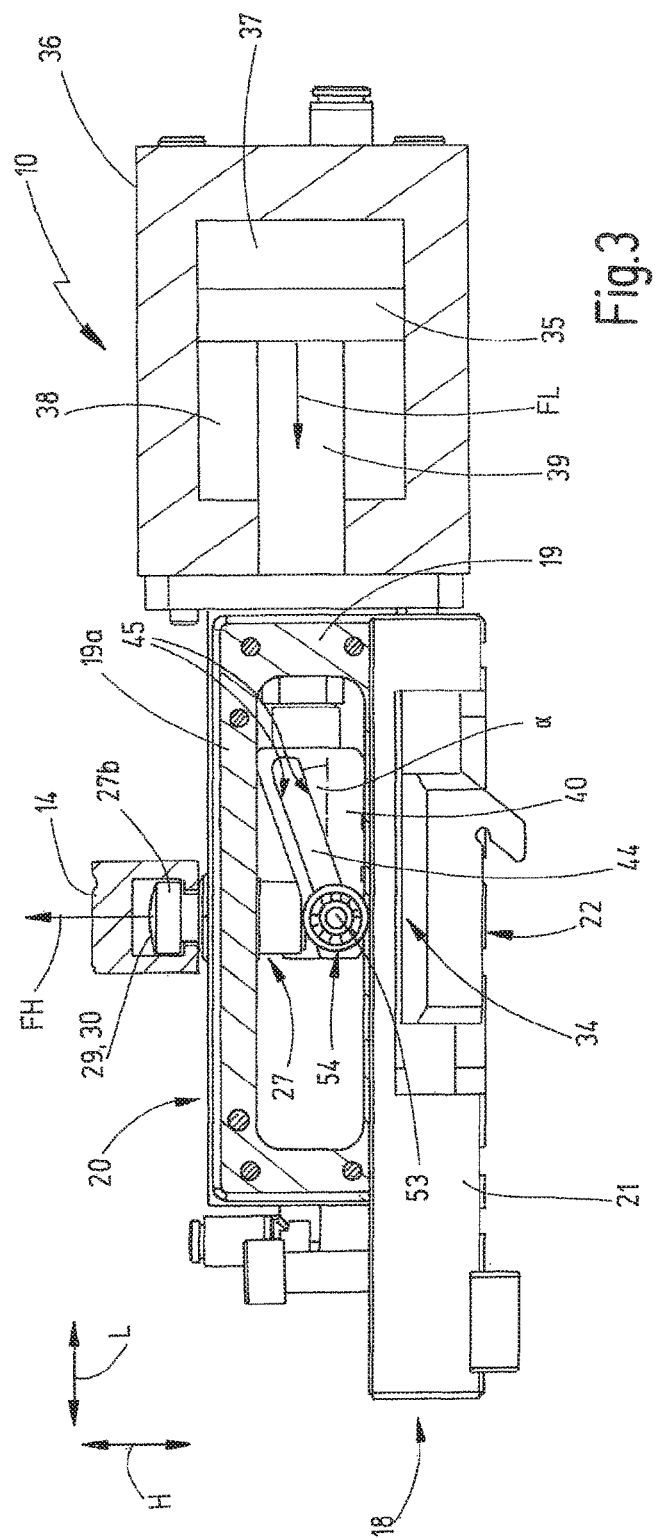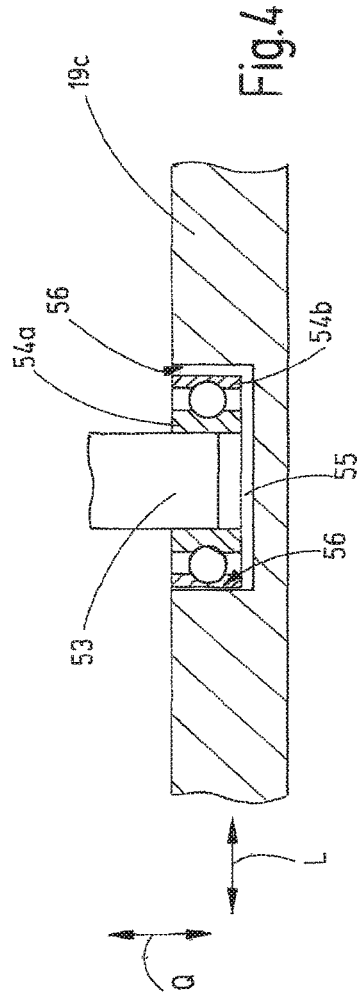

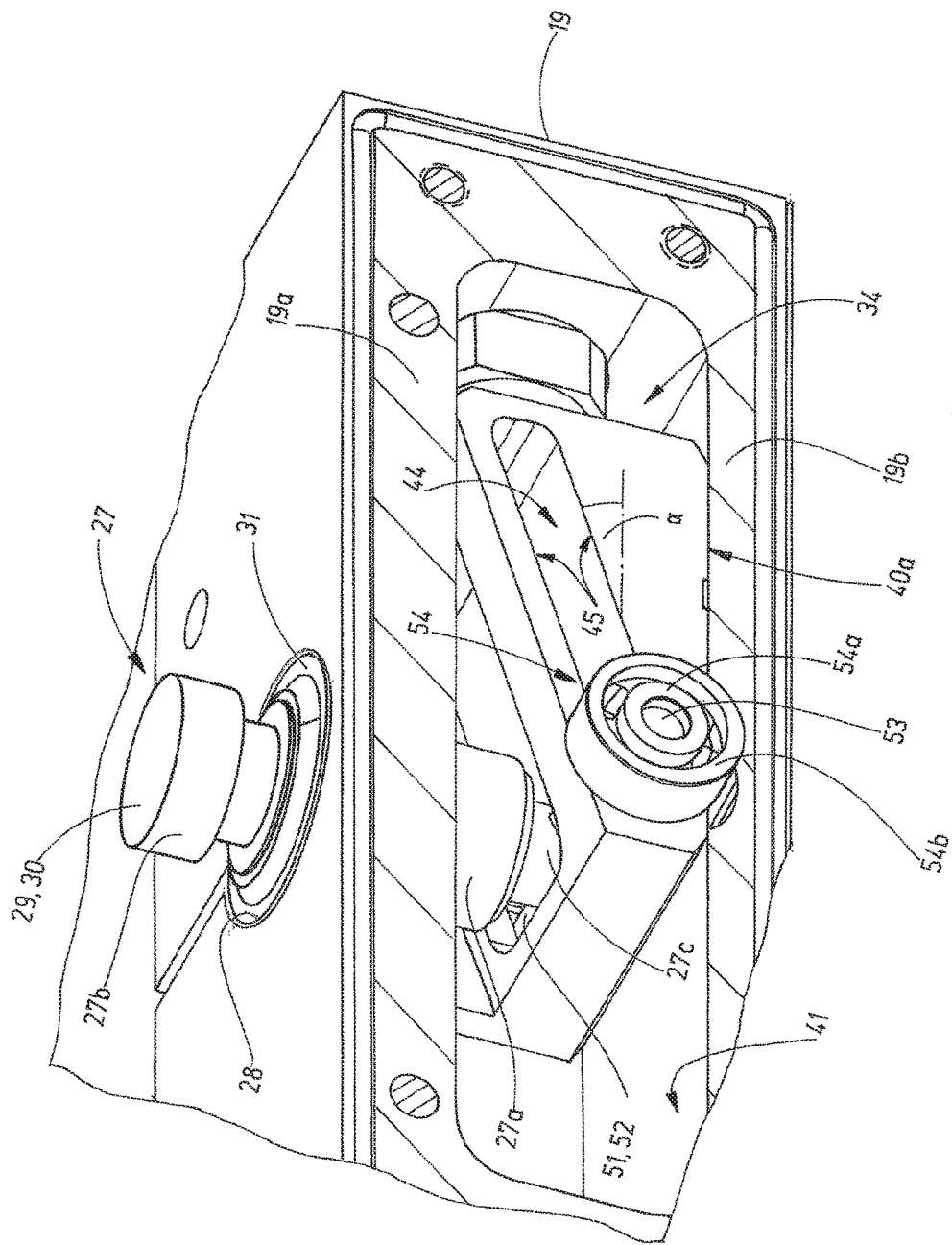

ACTUATING DEVICE FOR A STEADY REST

The invention relates to an actuating device for a steady rest. The actuating device is disposed for actuating the steady rest in order to switch the steady rest between a support position or clamping position, on the one hand, and a release position, on the other hand. In the support position or clamping position at least one jaw of the steady rest is in contact with a workpiece that is to be machined. For example, it is possible to clamp or hold a cylindrical workpiece radially with respect to its longitudinal axis by several, in particular three, jaws of the steady rest when the steady rest is in the support position or clamping position.

Such a steady rest has been known from document DE 60 208 835 T2, for example. A body that represents the input part of the steady rest is arranged in the housing of the steady rest and is moved by means of a hydraulic cylinder. This movement is translated by a steady rest transmission into the movement of the three jaws of the steady rest. As a result of this, a centered 3-point support of the workpiece is achieved.

A hydraulic cylinder is used to move the input part. A sufficiently great force can be made available via the hydraulic medium. In addition, the hydraulic fluid forms a rigid column and is able—while the workpiece is being machined—to easily support the force that potentially retroacts via the transmission on the bodies to be moved by the hydraulic cylinder. Via the volume flow of the hydraulic fluid, it is possible to very readily control the speed of the movement of the body of the steady rest and thus the speed of the movement of the jaws. Therefore, until now, hydraulic medium has only been used for actuating the input part of the steady rest. To accomplish this, a machine tool must be provided for the steady rest of a hydraulic circuit.

Therefore, the object of the invention may be considered to be the provision of an actuating device for a steady rest, said device not requiring the use of hydraulic fluid.

This object is achieved by an actuating device exhibiting the features of Patent claim 1.

The actuating device comprises a carrier with a mounting side that is disposed for the installation of the steady rest. The mounting side is an interface with which the actuating device can be coupled to a steady rest.

The actuating device comprises an actuating part that is supported by the carrier so as to be movable in a height direction. The actuating part has an outer end and an inner end in height direction. The outer end is associated with the mounting side or the steady rest and comprises a connecting arrangement that is disposed to be connected to the input part of the steady rest. The movement of the input part in height direction triggers the movement of the jaws of the steady rest toward and away from the workpiece.

Furthermore, a double-acting pneumatic cylinder is mounted to the carrier. The pneumatic cylinder comprises a piston that divides the cylinder chamber into two working chambers in a fluid-tight manner. Via a coupling arrangement, the piston is movably coupled with the actuating part. Preferably, the piston moves in a longitudinal direction that is oriented at a right angle with respect to the height direction.

The coupling arrangement comprises a slide that is connected to the piston of the pneumatic cylinder, for example via a piston rod. The slide is supported by the carrier so as to be movable in longitudinal direction. At least one slotted gate is provided on the slide. The slotted gate defines a gate path extending obliquely to the height direction and obliquely to the longitudinal direction, in which case an associate gate element of the coupling arrangement is arranged so as to be movably guided in the gate path. The at least one gate element is connected to the inner end of the actuating part. With the longitudinal direction, the gate path subtends an angle of inclination that is smaller than 45° and, preferably, smaller than 30° and, more preferably, smaller than 20°.

In particular, the actuating part can be moved only within a single degree of freedom in height direction. In particular, the slide can be moved only within one degree of freedom in longitudinal direction. The at least one gate element is preferably rigidly connected to the actuating part relative to the actuating part in height direction and in longitudinal direction.

Via the coupling arrangement, a pneumatic force provided by the pneumatic cylinder and acting in height direction is translated by the actuating part to the actuating force that can be transmitted to the steady rest. Consequently, the actuating force is greater than the pneumatic force. In doing so, the path is reduced from the pneumatic cylinder to the actuating part, so that the path of the piston is greater than the path traveled by the actuating part. An actuating force in moving-out direction of the actuating part, as well as in moving-in direction, can be transmitted via the coupling arrangement.

Due to the friction in the coupling arrangement, a friction force acting counter the pneumatic force is generated for the pneumatic cylinder. The dynamic friction force is preferably greater than a specified minimum value that can be determined as a function of the pneumatic force provided by the pneumatic cylinder. The slide pairing in the coupling arrangement can be selected accordingly. Due to the coupling arrangement that is subject to friction, a minimum load acts on the pneumatic cylinder at all times, as it were.

The actuating device can be used for known hydraulically actuated steady rests and selectively replace the hydraulic cylinder provided there with the pneumatically actuated actuating device. By way of the arrangement of the pneumatic cylinder and the connection of the pneumatic cylinder to the actuating part via the coupling arrangement, it is possible to achieve the same forces on the actuating part as with the hydraulic, direct actuation of the input part of the steady rest. By coupling the pneumatic cylinder via the coupling arrangement with the actuating part and the dynamic friction force, it is possible to prevent shock-like moving-out movements of the actuating part and thus shock-like movements of the jaws of the steady rest. Due to the compressibility of the air that is used for moving the piston in the pneumatic cylinder this was not to be expected.

It is preferred that the slide pairing in the coupling arrangement are selected in such a manner that the difference between the static friction or the coefficient of static friction and the dynamic friction or the coefficient of dynamic friction of the coupling arrangement is smaller than a specified difference value of 0.1.

It is advantageous if the angle of inclination is smaller by at least 2° to 3°

$$FH_{soll}=FL_{max}(\sin \alpha)(\cos \alpha)$$

wherein $FH_{soll}$ is the specified required actuating force in height direction on the actuating part, $FL_{max}$ is the specified maximum pneumatic force in longitudinal direction of the pneumatic cylinder, and $\alpha$ is the angle of inclination of the gate path.

In a preferred embodiment the slide has two slotted gates arranged in transverse direction at a right angle with respect to the longitudinal direction and at a distance from each other in height direction.

Each slotted gate on the slide is preferably formed by a groove or a slit. It is preferred if the angle of inclination of the gate path is constant and the angle path is straight.

In a preferred embodiment the actuating part is supported by the carrier above the slide by means of a sliding bearing bushing. The sliding bearing bushing may be arranged adjoining the mounting side. The length of the sliding bearing bushing in height direction is smaller than that of the actuating part, so that—depending on the position of the actuating part—only one section is guided within the sliding bearing bushing.

It is advantageous if the actuating part has a support arrangement on its inner end, by means of which support arrangement the actuating part is supported in longitudinal direction by the carrier. It is possible, for example, to use an roller bearing assembly in order to minimize the friction force during the movement of the actuating part in height direction. The roller bearing acts between the support part and the carrier.

The support part preferably extends in a transverse direction at a right angle with respect to the longitudinal direction and the height direction from the inner end of the actuating part on two sides. In doing so, said support part may preferably extend into or through the two slotted gates provided on the slide. Furthermore, it is preferred if the support part extends through the slotted gates and is connected—on the respective free end—to an associate roller bearing of the roller bearing assembly. In doing so, the gate elements may be provided or formed on the support part, said gate elements being located in the respective slotted gate.

Furthermore, it is preferred if each roller bearing of the roller bearing assembly is supported by at least one support surface that is oriented at a right angle with respect to the longitudinal direction. Consequently, the normal vector of the support surface extends in longitudinal direction. It is preferred if each roller bearing is arranged at least partially within a groove that extends on the carrier in height direction and wherein each of the groove flanks forms a support surface. In doing so, the distance of the groove flanks or the support surfaces is greater by a necessary minimal play than the outer diameter of the roller bearing.

Preferably, the slide is supported on one underside so that it can be moved in a sliding manner on a running surface. The underside and the running surface are machined to form a slide pairing and are nitrided in a preferred exemplary embodiment.

In another advantageous embodiment the carrier has a closed housing in which the slide is arranged. The housing of the carrier can be made in a fluid-tight manner so that no particulate matter due to cooling fluid, shavings or the like can get into the housing.

Each existing slotted gate may comprise parallel-extending gate surfaces between which the gate path is defined. The gate element is guided in the slit between the two gate surfaces.

Figure 2:
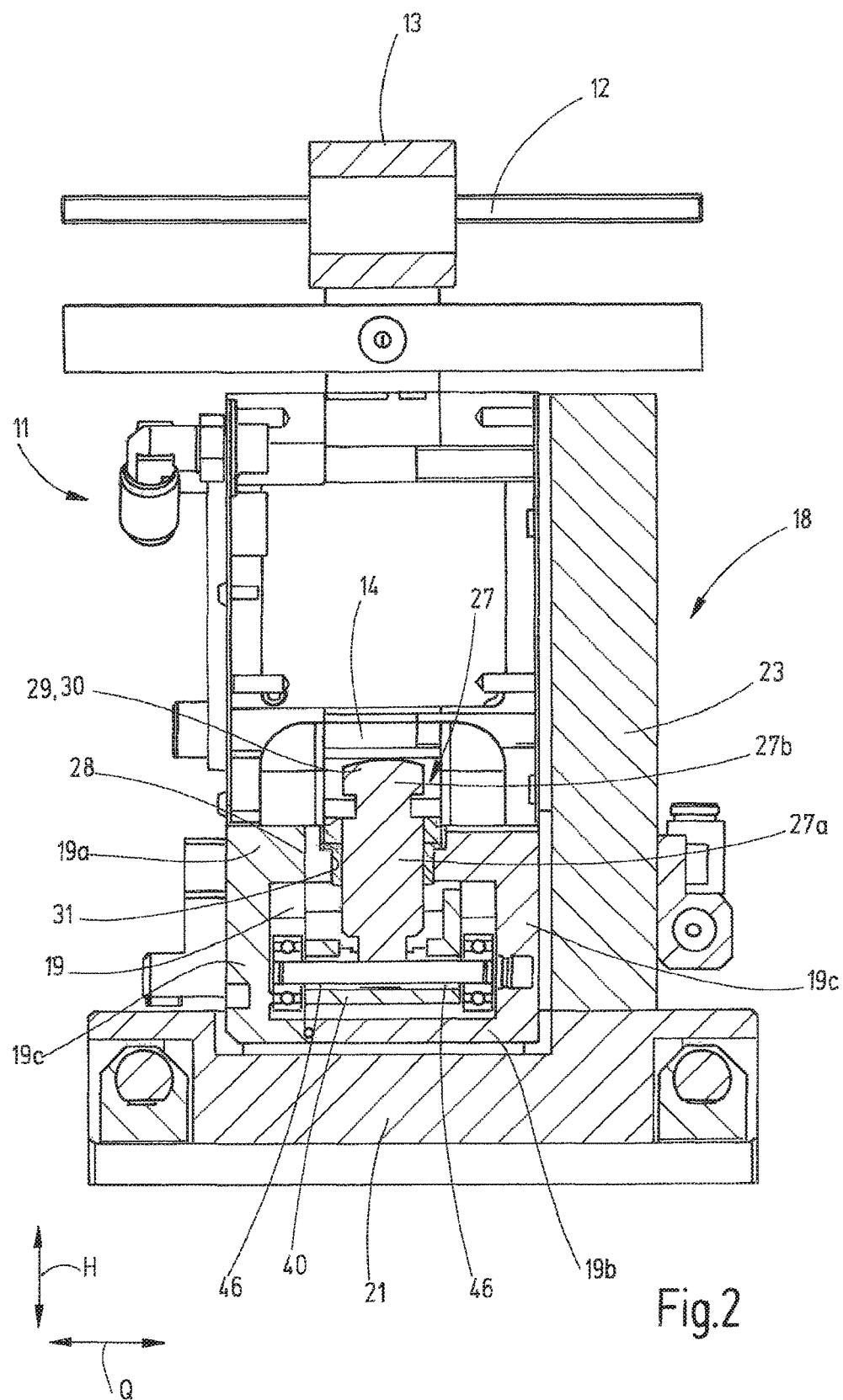
Figure 6:
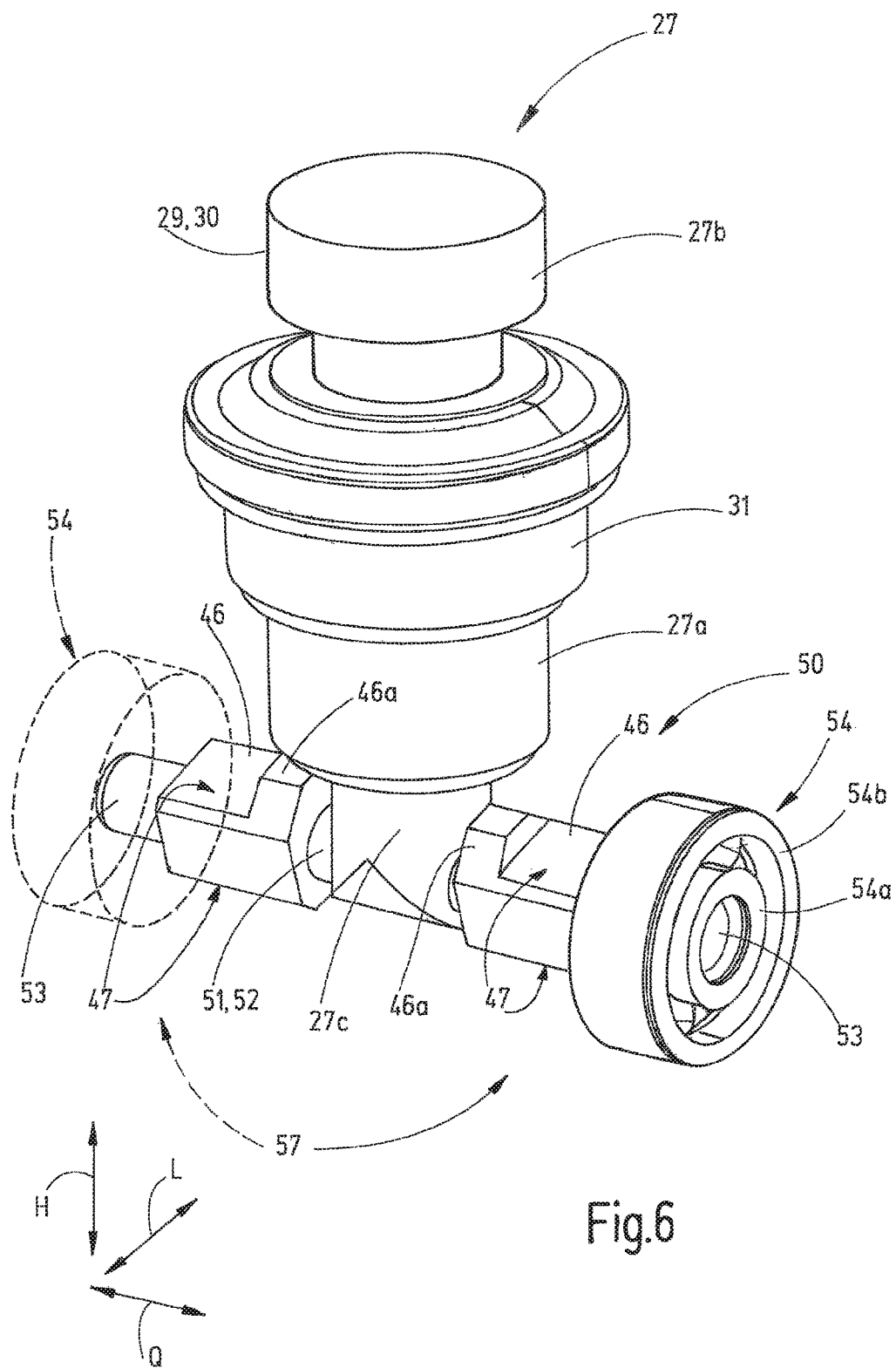
Figure 7:
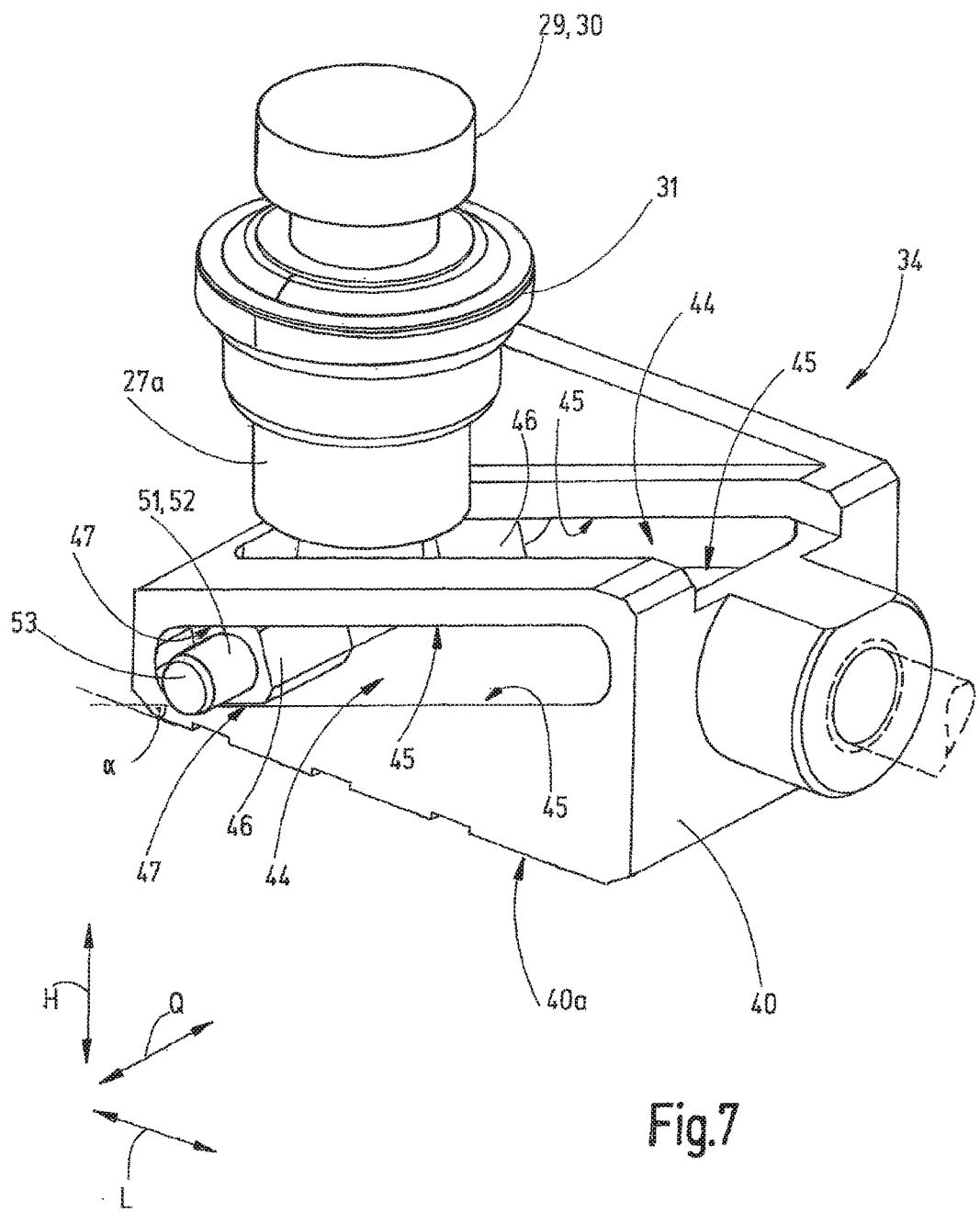

Advantageous exemplary embodiment of the actuating device can be inferred from the dependent claims, the description and the drawings. Hereinafter, preferred exemplary embodiments are explained in detail with reference to the drawings. They show in FIG. 1 a schematic representation of a steady rest and an exemplary embodiment of the actuating device;

FIG. 2 a sectional view at a right angle with respect to a longitudinal direction, along section line II-II in FIG. 1, of the actuating device and the steady rest according to FIG. 1;

FIG. 3 a lateral view, partially in section, of the actuating device according to FIGS. 1 and 2;

FIG. 4 a schematic representation of an roller bearing at a right angle with respect to a height direction;

FIG. 5 a perspective partial illustration of the actuating device and, in particular, of a slide and of the actuating part of the actuating device;

FIG. 6 a perspective illustration of an exemplary embodiment of an actuating part; and FIG. 7 a perspective representation of the actuating part according to FIG. 6, in a state coupled with an exemplary embodiment of a slide of the actuating device.

The invention relates to an actuating device 10 for actuating a steady rest 11. The steady rest 11 comprises at least one jaw and, in the exemplary embodiment, three jaws 12 that can be moved between a support position or clamping position acting on a workpiece 13 and a release position (shown in FIG. 1) remote from the workpiece 13. For moving the jaws 12 between the support position and the release position, the steady rest 11 has an input part 14 (FIGS. 2 and 3). The movement of the input part 14 is converted into a movement of the jaws 12 by a not illustrated steady rest drive.

The input part 14 that is usually directly actuated by the hydraulic cylinder acts as the input interface for the actuating device 10.

The actuating device 10 comprises a carrier 18 that contains a housing 19 in the exemplary embodiment described herein. A mounting side 20 is provided on the housing 19 on an upper wall 19a, said mounting side being disposed for mounting the steady rest 11. In doing so, the input part 14 is accessible from the mounting side 20. In the exemplary embodiment, the carrier 18 also comprises a base plate 21 by means of which the actuating device 10, together with the steady rest 11, can be arranged on a machine tool. To accomplish this, the base plate 21 may comprise a mounting arrangement 22. In accordance with the example, the base plate 21 extends in a transverse direction Q, as well as in a longitudinal direction L. A lower wall 19b opposite the upper wall 19a of the housing is arranged on the base plate 21. Next to the housing 19, the carrier may comprise a support plate 23 that is connected to the base plate 21 and extends, starting from the base plate 21, in a height direction H. The housing 19 and/or the steady rest 11 may be mounted to the support plate 23 (FIG. 2).

The actuating device 10 comprises an actuating part 27 that can be moved in height direction H on the carrier 18 and, in accordance with the example, is supported by the housing 19. For this purpose, the upper wall 19a has a passage opening 28. A dynamic friction bearing point is formed in the passage opening 28, in which opening the actuating part 27 can be moved in height direction H. To this end, a sliding bearing bushing 31 is inserted in the passage opening 28, said bushing enclosing the actuating part 27 in circumferential direction around the high direction H. The sliding bearing bushing 31 is shown in FIGS. 2 and 5-7. It can be seen that the height of the sliding bearing bushing 31 is shorter in height direction H than a cylindrical section 27a of the actuating part 27.

An outer end 27b of the actuating part 27 is arranged outside the housing 19 and has a connecting arrangement 29 that is intended and disposed for coupling the actuating part 27 with the input part 14 of the steady rest 11. In the exemplary embodiment described here, the connecting arrangement 29 is implemented by the shape of the outer end 27b that, in accordance with the example, has the shape of a mushroom head 30. The input part 14 has a contour adapted thereto, said contour extending around the mushroom head 30, as is schematically illustrated by FIGS. 2 and 3. Consequently, a moving coupling can be established between the actuating part 27 and the input part 14 in height direction H by means of the connecting arrangement 29. The connecting arrangement 29 may also be in the form of other positive and/or non-positive connecting means.

The actuating part 27 has an inner end 27c opposite the outer end 27b in height direction H, said inner end being arranged inside the housing 19. The inner end 27c of the actuating part 27 is coupled with the piston 35 of a pneumatic cylinder 36 via a coupling arrangement 34. The pneumatic cylinder 36 is configured as a double-acting cylinder having a first working chamber 37 and a second working chamber 38 (FIG. 3). The piston 35 fluidically separates the two working chambers 37, 38 from each other. The piston 35 is arranged in longitudinal direction L so as to be movable in the cylinder housing of the pneumatic cylinder 36 and is connected to a piston rod 39 that extends out of the cylinder housing of the pneumatic cylinder 36 in longitudinal direction L and is connected on its end opposite the piston 35 to a slide 40 of the coupling arrangement 34. The slide is immovably connected in longitudinal direction L relative to the piston rod 39. Together, the piston 35, the piston rod 39 and the slide 40 thus form a unit that can move in longitudinal direction L independently of the application of pressure in the working chambers 37, 38.

The slide 40 is depicted in FIGS. 5 and 7, in particular. An underside 40a of the slide is supported in a sliding manner by a running surface 41 on the inside of the housing 19. The running surface 41 is arranged on the lower wall 19b of the housing 19 or is formed by the lower wall 19b. In accordance with the example, the dynamic pairing between the lower side 40a and the running surface 41 is adjusted in such a manner that a suitable dynamic friction force or static friction force results, said force acting counter the pneumatic force FL being provided by the pneumatic cylinder 36 and acting in longitudinal direction L. In the exemplary embodiment described herein, the running surface 41, as well as the underside 40a of the slide 40 are nitrided. The housing 19 and the slide 40 are each made of metal or a metal alloy. It is also possible to nitride the housing 19 or the slide 40 as a whole.

The underside 40a and the running surface 41 each extend in a plane that is spanned by longitudinal direction L and transverse direction Q.

Looking in transverse direction Q, the slide 40 is approximately wedge-shaped. It comprises at least one and, in the exemplary embodiment, two slotted gates 44. The two slotted gates 44 are arranged at a distance from each other in transverse direction Q. Each slotted gate 44 is delimited by two opposing gate surfaces 45 which face each other. The two gate surfaces 45 may be, for example, oppositely located groove flanks. In the exemplary embodiment described herein, each slotted gate 44 is formed by a slit that is open toward both sides in transverse direction Q. The slits or slotted gates 44 are arranged so as to be in alignment with each other in transverse direction Q. In height direction H, the two gate surfaces 45 of a slotted gate 44 are at a distance from each other and delimit the slit that forms the slotted gate 44.

Each slotted gate 44 or the two gate surfaces 45 define a gate path, along which a gate element 46 associated with the slotted gate 44 is arranged on the slide 40 so that said gate can be guided in a slidable manner. Each slotted gate 44 is associated with a separate gate element 46. In the exemplary embodiment shown here, the gate elements 46 have a contour that has substantially the form of a parallelepiped or is similar to the form of a parallelepiped. One element surface 47 of the gate element 46 is in contact with the two gate surfaces 45 of the associate slotted gate 44.

In the exemplary embodiment, the gate path is straight and inclined with respect to longitudinal direction L. Each of the gate surfaces 45 of each slotted gate 44 extends in one plane that is oriented parallel to transverse direction Q, however is inclined with respect to longitudinal direction L and height direction H. As a result of this, the gate path is imparted with an angle of inclination a with respect to the plane that is spanned by longitudinal direction L and transverse direction Q or, with respect to the underside 40a of the slide 40, the angle of inclination a is smaller than 45° and preferably smaller than 30°. In the exemplary embodiment the angle of inclination a is smaller than 20° and, in accordance with the example, is 18°.

A support arrangement 50 is connected to the inner end 27c of the actuating part 27. The support arrangement 50 comprises a support part 51 that, in accordance with the example, is configured as a cylindrical pin 52. The support part 51 extends in transverse direction Q on both sides away from the inner end 27c of the actuating part 27. For this, a passage hole, for example, may be provided on the inner end 27c, through which hole the pin 52 is inserted.

An roller bearing 54 is arranged on each free end 53 of the support part 51. The roller bearing 54 may be a roller bearing. In accordance with the example, a deep-groove ball bearing is used as roller bearing 54. FIG. 6 only shows one of the two roller bearings 54, while the respectively other roller bearing 54 is only indicated schematically in dashed lines. An inner ring 54 of each roller bearing 54 is connected in a torque-proof manner to the associate free end 53 of the support part. An outer ring 54b of each roller bearing 54 is supported so as to be rotatable relative to the respective inner ring 54a and is supported by the carrier 18 and, in accordance with the example, by the housing 19. To accomplish this, respectively one groove 55 extending in height direction H is provided in the lateral walls 19c of the housing, said walls connecting respectively the upper wall 19a to the lower wall 19b on opposite sides in transverse direction Q. The groove 55 is open in transverse direction Q and extends in height direction H in the lateral wall 19c. In longitudinal direction L, two support surfaces 56 of the groove 55, said surfaces being formed by the groove flanks, are located opposite each other at a distance, wherein the distance is slightly greater than the outside diameter of the outer ring 54b of the roller bearing 54. Consequently, the two support surfaces 56 extend at a right angle with respect to longitudinal direction L. Each roller bearing 54 is partly or completely arranged in an associated groove 55, so that the outer ring 54b is supported by respectively one of the two support surfaces 56 and, when the actuating part 27 is moved in height direction H, rolls off the respective support surface 56.

Consequently, the roller bearings 54 form an roller bearing assembly 57 by means of which the support arrangement 50 supports the inner end 27c of the actuating part 27 in longitudinal direction L in order to delimit a movement of the inner end 27c of the actuating part 27 in longitudinal direction L or to avoid such movement, apart from a required minimal play.

As is obvious from FIGS. 6 and 7, in particular, the support part 51 or the pin 52 also bears the two gate elements 46. It is also possible to configure the gate elements 46 as an integral part of the support part 51 or the actuating part 27—without seams or joints.

In the exemplary embodiment described herein, the gate elements 46 comprise passage holes extending in transverse direction Q, through which holes extends the support part 51 and, in accordance with the example, the pin 52. In doing so, the support part 51 or the pin 52 extends also through the respective gate 44, so that its free end 53 is located in transverse direction Q outside the slotted gate 44 next to the slide 40. The respective roller bearing 54 is then connected to this free end 53.

The gate elements 46 may be arranged on the pin 52 so as to be slidable in transverse direction Q. For positioning the gate elements 46, it is possible for there to be a stop 46a projecting adjacent to one of the element surfaces 47, said stop being in contact with the slide 40 and preventing or delimiting a shifting of the gate element 46 in transverse direction Q, away from the inner end 27c of the actuating part 27. A shifting movement of the gate element 46 in transverse direction Q toward the inner end 27c is delimited by the inner end 27c itself.

In accordance with the example, the housing 19 is designed so as to be fluid-tight. A sealing arrangement may be interposed at each of the connecting locations of the housing 19 with the steady rest 11 and the pneumatic cylinder 36 in order to seal the connections and prevent cooling medium, dirt particles, shavings or other foreign objects from entering the housing 19 and the moving components at the connecting locations.

The actuating device 10 for actuating the steady rest works as follows:

An appropriate air pressure is applied to the working chambers 37, 38 of the pneumatic cylinder in order to actuate the jaws 12 of the steady rest 11. The pressure in the working chambers 37, 38 is at least 1 bar and at most 6 bar. When pressure is applied to the first working chamber 37, the piston rod 39 is forced out of the cylinder housing of the pneumatic cylinder 36 and when pressure is applied to the second working chamber 38, the piston rod 39 is forced into the cylinder housing of the pneumatic cylinder 36. The pneumatic cylinder 36 provides a pneumatic force FL in longitudinal direction L, said force acting on the slide 40 and displacing or sliding the slide 40 accordingly in longitudinal direction L. As a result of a shifting movement of the slide 40, the gate elements 46 in the respectively associate gate 44 slide along the gate path on the slide 40 at an angle of inclination a, thus allowing the triggering of a movement of the actuating part 27 in height direction H. If, due to the load of the steady rest 11 or the input part 14, a movement of the actuating part 27 is prevented, the pneumatic force FL is translated, with the aid of the coupling arrangement 34, into an actuating force FH on the actuating part 27 in height direction H. The actuating force FH is greater than the pneumatic force FL. The relationship between the forces is given by the following equation:

$$FH = FL(\sin \alpha)(\cos \alpha)$$

For actuating the steady rest, a nominal value $FH_{soll}$ for the actuating force FH is specified. The pneumatic cylinder makes available a specified maximum pneumatic force $FL_{max}$. In accordance with the example, the angle of inclination a is at least 2° to 3° smaller than would be required for achieving the nominal value $FH_{soll}$ for the actuating force FH with a given maximum pneumatic force $FL_{max}$. Consequently, the following applies:

$$FH_{soll} < FL_{max}(\sin \alpha)(\cos \alpha)$$

As a result of this measure, it is possible to equalize friction forces in the coupling arrangement 34, these again existing in order to ensure a gentle moving-out and moving-in of the actuating part 27 or the piston rod 39, even when the load or counter-force given by the steady rest 11 is minimal.

By means of the support arrangement 50 a tilting of the actuating part 27 relative to height direction H is prevented. The inner end 27c is supported in longitudinal direction L by the carrier 18 via the support arrangement 50 and, in accordance with the example, via the roller bearing 27, and is supported by the housing 19 in the exemplary embodiment. Thus it is avoided that the actuating part 27 becomes wedged in the sliding bearing bushing 31 which can lead to increased wear, on the one hand, and could prevent sufficient actuating force FH in height direction H, on the other hand.

The present invention relates to an actuating device 10 for actuating jaws 12 of a steady rest 11, which jaws can be used for clamping or supporting a workpiece 13. The actuating device comprises a carrier 18 with a mounting side 20 to which the steady rest 11 can be mounted. An outer end 27b of an actuating part 27 projects away from the mounting side 20 of the carrier 18 and comprises a connecting arrangement 29 as the interface for the connection with an input part 14 of the steady rest 11. An inner end 27c of the actuating part 27 is movably coupled with a piston 35 of a pneumatic cylinder 36 via a coupling arrangement 34. The coupling arrangement 34 comprises a slide 40 that is immovably connected to the piston 35, said slide having on it at least one slotted gate 44. The slotted gate 44 defines a gate path oriented obliquely to longitudinal direction L and to height direction H, along which gate path the at least one gate element 46 can be guided in a movable manner. The gate element is connected to the inner end 27c of the actuating part 27.

LIST OF REFERENCE SIGNS

10 Actuating device
11 Steady rest
12 Jaw
13 Workpiece
14 Input part
18 Carrier
19 Housing
19a Upper wall of the housing
19b Lower wall of the housing
19c Lateral wall
20 Installation side
21 Base plate
22 Mounting arrangement
23 Support plate
27 Actuating part
27a Cylindrical section of the actuating part
27b Outer end
28 Passage opening
29 Connecting arrangement
30 Mushroom head
31 Sliding bearing bushing
34 Coupling arrangement
35 Piston
36 Pneumatic cylinder
37 First working chamber
38 Second working chamber
39 Piston rod
40 Slide
40a Underside of the slide
44 Slotted gate
45 Gate surface 46 Gate element
46a Stop
47 Element surface
50 Support arrangement
51 Support part
52 Pin
53 Free end of the support part
54 Roller bearing
54a Inner ring
54b Outer ring
55 Groove
56 Support surface
57 Roller bearing assembly
α Angle of inclination
FH Actuating force
FL Pneumatic force
H Height direction
L Longitudinal direction
Q Transverse direction

The invention claimed is:

1. Actuating device for a steady rest for supporting and/or clamping a workpiece, comprising:
    a carrier having a mounting side that is adapted for mounting the steady rest;
    an actuating part that is supported by the carrier so as to be movable in height direction (H) and has, on an outer end, a connecting arrangement for connection with an input part of the steady rest; and
    a double-acting pneumatic cylinder mounted to the carrier, the piston of said cylinder being movably coupled to the actuating part via a coupling arrangement,
    wherein the coupling arrangement includes a slide connected to the piston, said slide being supported so as to be movable in longitudinal direction (L) perpendicular to the height direction (H), and further includes at least one slotted gate extending obliquely with respect to the longitudinal direction (L) and the height direction (H), said gate defining a gate path along which at least one gate element of the coupling arrangement is movably guided, wherein the gate path and the longitudinal direction (L) subtend an angle of inclination (α) that is smaller than 45°, and
    wherein the actuating part is connected to the at least one gate element at an inner end opposite the outer end.

2. Actuating device according to claim 1, wherein the actuating part is actuated with a specified actuating force ($FH_{soll}$) acting in height direction (H), the pneumatic cylinder provides a specified pneumatic force ($FL_{max}$) acting in longitudinal direction (L), and the angle of inclination (α) satisfies the following equation:

$$FH_{soll} < FL_{max}(\sin\alpha)(\cos\alpha).$$

3. Actuating device according to claim 1, wherein the slide includes two slotted gates arranged at a distance with respect to each other in a transverse direction (Q) at a right angle with respect to longitudinal direction (L) and with respect to height direction (H).

4. Actuating device according to claim 1, wherein the actuating part is supported in height direction (H) above the slide by means of a sliding bearing bushing at the carrier.

5. Actuating device according to claim 1, wherein the actuating part has, at its inner end, a support arrangement by means of which the actuating part is supported in longitudinal direction (L) at the carrier.

6. Actuating device according to claim 5, wherein the support arrangement includes a roller bearing assembly that provides a rolling bearing between a support part and the carrier.

7. Actuating device according to claim 6, wherein the support part extends on two sides in a transverse direction (Q), perpendicular to longitudinal direction (L) and to the height direction (H), away from the inner end of the actuating part.

8. Actuating device according to claim 3, wherein the actuating part extends into both slotted gates or through both slotted gates.

9. Actuating device according to claim 6, wherein the roller bearing assembly includes two roller bearings arranged at a distance from each other in a transverse direction (Q) perpendicular to the longitudinal direction (L) and to height direction (H).

10. Actuating device according to claim 9, wherein each roller bearing of the roller bearing assembly is supported by at least one support surface that is oriented perpendicular to the longitudinal direction (L).

11. Actuating device according to claim 1, wherein one underside of the slide is slidably supported on a running surface.

12. Actuating device according to claim 11, wherein the underside of the slide and/or the running surface are nitrided.

13. Actuating device according to claim 1, wherein the carrier includes a closed housing in which the slide is arranged.

14. Actuating device according to claim 1, wherein the angle of inclination (α) of the at least one slotted gate is constant.

15. Actuating device according to claim 1, wherein the at least one slotted gate has two gate surfaces extending parallel to each other, said gate surfaces defining the gate path and having an associated one of the at least one gate element arranged between them.

* * * * *